(12) United States Patent
Carrette et al.

(10) Patent No.: US 11,534,742 B2
(45) Date of Patent: Dec. 27, 2022

(54) CATALYST ADDITIVATED WITH ALKYL LACTATE, PREPARATION THEREOF AND USE THEREOF IN A HYDROTREATING AND/OR HYDROCRACKING PROCESS

(71) Applicant: IFP Energies nouvelles, Rueil-Malmaison (FR)

(72) Inventors: Pierre-Louis Carrette, Rueil-Malmaison (FR); Florent Guillou, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 183 days.

(21) Appl. No.: 17/255,801

(22) PCT Filed: Jun. 21, 2019

(86) PCT No.: PCT/EP2019/066437
§ 371 (c)(1),
(2) Date: Dec. 23, 2020

(87) PCT Pub. No.: WO2020/002139
PCT Pub. Date: Jan. 2, 2020

(65) Prior Publication Data
US 2021/0229082 A1 Jul. 29, 2021

(30) Foreign Application Priority Data
Jun. 27, 2018 (FR) ...................... 1855773

(51) Int. Cl.
| | | |
|---|---|---|
| *B01J 31/02* | (2006.01) | |
| *B01J 20/283* | (2006.01) | |
| *B01J 20/284* | (2006.01) | |
| *B01J 37/02* | (2006.01) | |
| *B01J 37/20* | (2006.01) | |
| *B01J 37/28* | (2006.01) | |
| *C10G 49/02* | (2006.01) | |

(52) U.S. Cl.
CPC ......... *B01J 31/0209* (2013.01); *B01J 20/283* (2013.01); *B01J 20/284* (2013.01); *B01J 37/0213* (2013.01); *B01J 37/20* (2013.01); *B01J 37/28* (2013.01); *C10G 49/02* (2013.01)

(58) Field of Classification Search
CPC ...... B01J 20/283; B01J 20/284; B01J 27/188; B01J 27/19; B01J 31/0209; B01J 35/1019; B01J 35/1042; B01J 35/1061; B01J 37/0201; B01J 37/0203; B01J 37/0213; B01J 37/024; B01J 2523/00; C10G 49/02; C10G 49/04
See application file for complete search history.

(56) References Cited

U.S. PATENT DOCUMENTS

| | | | |
|---|---|---|---|
| 3,954,673 | A | 5/1976 | Morimoto |
| 4,012,340 | A | 3/1977 | Morimoto |
| 4,981,828 | A | 1/1991 | Takahashi et al. |
| 5,162,281 | A | 11/1992 | Kamo et al. |
| 5,232,888 | A | 8/1993 | Kamo |
| 8,278,234 | B2 | 10/2012 | Galliou et al. |
| 8,318,628 | B2 | 11/2012 | Brun et al. |
| 2010/0234212 | A1 | 9/2010 | Brait et al. |
| 2014/0353213 | A1 | 12/2014 | Smegal et al. |
| 2018/0290131 | A1 | 10/2018 | Carrette |

FOREIGN PATENT DOCUMENTS

| | | |
|---|---|---|
| EP | 0300629 B1 | 1/1991 |
| EP | 0496592 B1 | 7/1994 |
| EP | 0482817 B1 | 12/1995 |
| EP | 2174711 B1 | 9/2018 |
| FR | 2910351 A1 | 6/2008 |
| WO | 16173759 A1 | 11/2016 |

OTHER PUBLICATIONS

International Search Report PCT/EP2019/066437 dated Sep. 4, 2019 (pp. 1-5).

*Primary Examiner* — Brian A McCaig
(74) *Attorney, Agent, or Firm* — Millen, White, Zelano and Branigan, P.C.; Harry B. Shubin

(57) ABSTRACT

The invention relates to a catalyst comprising a support based on alumina or silica or silica-alumina, at least one group VIII element, at least one group VIB element and at least one organic compound of formula (I)

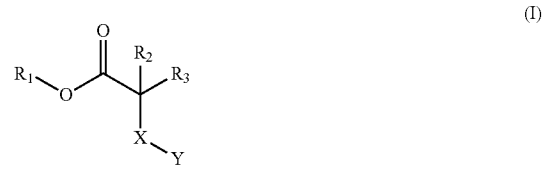

(I)

in which $R_1$ is a hydrocarbon-based radical comprising from 1 to 12 carbon atoms, $R_2$ and $R_3$ are chosen from a hydrogen atom and a hydrocarbon-based radical comprising from 1 to 12 carbon atoms, X is chosen from an oxygen atom or a sulfur atom except when $R_2$ and $R_3$ represent a hydrogen atom, in which case X is an oxygen atom, Y is chosen from a hydrogen atom, a hydrocarbon-based radical comprising from 1 to 12 carbon atoms or a unit —C(O)$R_4$, $R_4$ being chosen from a hydrogen atom and a hydrocarbon-based radical comprising from 1 to 12 carbon atoms.

18 Claims, No Drawings

CATALYST ADDITIVATED WITH ALKYL LACTATE, PREPARATION THEREOF AND USE THEREOF IN A HYDROTREATING AND/OR HYDROCRACKING PROCESS

The invention relates to a catalyst that is additive-impregnated by means of an organic compound, to the method for preparing same and to the use thereof in the hydrotreating and/or hydrocracking field.

Usually, a catalyst for the hydrotreating of hydrocarbon-based fractions has the function of removing the sulfur-based or nitrogen-based compounds contained therein in order, for example, to make a petroleum product meet the required specifications (sulfur content, aromatic content, etc.) for a given application (motor vehicle fuel, gasoline or gas oil, domestic fuel oil, jet fuel). Conventional hydrotreating catalysts generally comprise an oxide support and an active phase based on Group VIB and VIII metals in the oxide forms thereof and also phosphorus. The preparation of these catalysts generally comprises a step of impregnating the metals and the phosphorus on the support, followed by drying and calcining enabling the active phase to be obtained in the oxide forms thereof. Before the use thereof in a hydrotreating and/or hydrocracking reaction, these catalysts are generally subjected to sulfurization in order to form the active species.

The addition of an organic compound to the hydrotreating catalysts to improve their activity has been recommended by those skilled in the art, notably for catalysts which have been prepared by impregnation followed by drying without subsequent calcination. These catalysts are often referred to as "additive-impregnated dried catalysts".

Many documents describe the use of various ranges of organic compounds as additives, such as nitrogen-based organic compounds and/or oxygen-based organic compounds.

In the family of oxygen-based organic compounds, the use of monools, diols or polyols which are optionally etherified is described in WO 96/41848, WO 01/76741, U.S. Pat. Nos. 4,012,340, 3,954,673, EP 601 722 and WO 2005/035691.

Several patents are also found that claim the use of carboxylic acids (EP 1 402 948, EP 0 482 817). In particular, in EP 0482 817, citric acid, and also tartaric, butyric, hydroxyhexanoic, malic, gluconic, glyceric, glycolic and hydroxybutyric acids have been described. The specificity lies in the drying, which must be performed at a temperature below 200° C.

The prior art mentions less frequently additives including ester functions (EP 1 046 424, WO 2006/077326).

US 2014/0353213 describes the use of lactams, cyclic esters (of lactone type) or cyclic ethers (of oxacycloalkane type).

Irrespective of the compounds chosen, the modifications induced do not always make it possible to sufficiently increase the performance of the catalyst in order to meet the specifications concerning the sulfur and/or nitrogen contents of fuels. Furthermore, it is often very difficult to deploy them industrially since the methods are so complex to implement.

Consequently, it appears essential, for catalyst manufacturers, to find novel hydrotreating and/or hydrocracking catalysts with improved performance.

SUMMARY

The invention relates to a catalyst comprising a support based on alumina or silica or silica-alumina, at least one Group VIII element, at least one Group VIB element and at least one compound of formula (I)

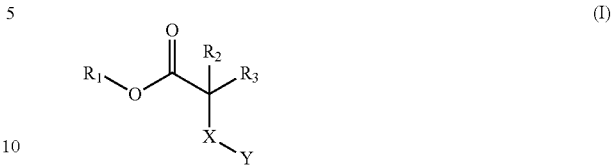

in which:
R$_1$ is a saturated or unsaturated, linear, branched or cyclic hydrocarbon-based radical comprising from 1 to 12 carbon atoms, R$_2$ and R$_3$ are chosen from a hydrogen atom and a saturated or unsaturated, linear, branched or cyclic hydrocarbon-based radical comprising from 1 to 12 carbon atoms, X is chosen from an oxygen atom or a sulfur atom, except when R$_2$ and R$_3$ represent a hydrogen atom, in which case X is an oxygen atom, Y is chosen from a hydrogen atom, a saturated or unsaturated, linear, branched or cyclic hydrocarbon-based radical comprising from 1 to 12 carbon atoms or a unit —C(O)R$_4$, R$_4$ being chosen from a hydrogen atom and a saturated or unsaturated, linear, branched or cyclic hydrocarbon-based radical comprising from 1 to 12 carbon atoms.

The Applicant has, in point of fact, found that the use of a compound of formula (I) as organic additive on a catalyst containing at least one Group VIII element and at least one Group VIB element makes it possible to obtain a hydrotreating and/or hydrocracking catalyst which shows improved catalytic performance.

Specifically, the catalyst according to the invention shows increased activity relative to the known catalysts that are not additive-impregnated and the known additive-impregnated dried catalysts. Typically, by means of increasing the activity, the temperature required to achieve a desired sulfur or nitrogen content (for example 10 ppm of sulfur in the case of a gas oil feedstock, in ULSD or ultra-low sulfur diesel mode) may be lowered. Similarly, the stability is increased, since the cycle time is prolonged by means of reducing the required temperature.

According to one variant, the compound of formula (I) is chosen from methyl lactate, ethyl lactate, propyl lactate, butyl lactate, isobutyl lactate, isopentyl lactate, cis-3-hexenyl lactate, L-menthyl lactate, butyl butyryl lactate, ethyl 2-mercaptopropanoate, methyl glycolate, ethyl glycolate, butyl glycolate, ethyl ethoxyacetate, ethyl α-hydroxyisobutanoate, tert-butyl α-hydroxyisobutanoate, ethyl 2-hydroxycaproate and ethyl 2-hydroxyvalerate.

According to another variant, R$_2$ represents a methyl radical and R$_3$ represents a hydrogen atom.

According to a preferred variant, the compound of formula (I) is chosen from butyl lactate and butyl butyryl lactate.

According to one variant, the content of Group VIB element is between 5% and 40% by weight expressed as Group VIB metal oxide relative to the total weight of the catalyst and the content of Group VIII element is between 1% and 10% by weight expressed as Group VIII metal oxide relative to the total weight of the catalyst.

According to one variant, the mole ratio of Group VIII element to Group VIB element in the catalyst is between 0.1 and 0.8.

According to one variant, the catalyst also contains phosphorus, the phosphorus content being between 0.1% and 20% by weight expressed as $P_2O_5$ relative to the total weight of the catalyst and the mole ratio of phosphorus to the Group VIB element in the catalyst is greater than or equal to 0.05.

According to one variant, the content of compound of formula (I) is between 1% and 45% by weight relative to the total weight of the catalyst.

According to one variant, the catalyst also contains an organic compound other than the compound of formula (I) containing oxygen and/or nitrogen and/or sulfur.

According to this variant, the organic compound(s) is (are) chosen from a compound including one or more chemical functions chosen from carboxylic, alcohol, thiol, thioether, sulfone, sulfoxide, ether, aldehyde, ketone, ester, carbonate, amine, nitrile, imide, oxime, urea, amide functions or even compounds including a furan ring or even sugars.

According to this variant, the organic compound other than the compound of formula (I) is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, gluconic acid, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicin, tricin, 2-furaldehyde (also known as furfural), 5-hydroxymethylfurfural (also known as 5-(hydroxymethyl)-2-furaldehyde or 5-HMF), 2-acetylfuran, 5-methyl-2-furaldehyde, ascorbic acid, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

According to one variant, the catalyst is at least partially sulfurized.

The invention also relates to processes for preparing the catalyst according to the invention as described in the claims.

The invention also relates to the use of the catalyst according to the invention in a process for the hydrotreating and/or hydrocracking of hydrocarbon-based fractions.

Hereinbelow, the groups of chemical elements are given according to the CAS classification (CRC Handbook of Chemistry and Physics, published by CRC Press, Editor in Chief D. R. Lide, 81$^{st}$ edition, 2000-2001). For example, Group VIII according to the CAS classification corresponds to the metals of columns 8, 9 and 10 according to the new IUPAC classification.

The term "hydrotreating" refers to reactions notably encompassing hydrodesulfurization (HDS), hydrodeazotization (HDN) and hydrogenation of aromatics (HOA).

DETAILED DESCRIPTION OF THE INVENTION

Catalyst

The invention relates to a catalyst comprising a support based on alumina or silica or silica-alumina, at least one Group VIII element, at least one Group VIB element and at least one organic compound of formula (I) as described hereinbelow.

The catalyst according to the invention may be a fresh catalyst, i.e. a catalyst that has not been used beforehand as catalyst in a catalytic unit and notably in hydrotreating and/or hydrocracking.

The catalyst according to the invention may also be a rejuvenated catalyst. The term "rejuvenated catalyst" means a catalyst which has been used as catalyst in a catalytic unit and notably in hydrotreating and/or hydrocracking and which has been subjected to at least one step of partial or total removal of coke, for example by calcining (regeneration). This regenerated catalyst is then additive-impregnated with at least one compound of formula (I) to obtain the rejuvenated catalyst. This rejuvenated catalyst may contain one or more other organic additives which may be added before, after or at the same time as the compound of formula (I).

The hydrogenating function of said catalyst, also known as the active phase, is provided by at least one Group VIB element and by at least one Group VIII element.

The preferred Group VIB elements are molybdenum and tungsten. The preferred Group VIII elements are non-noble elements and in particular cobalt and nickel. Advantageously, the hydrogenating function is chosen from the group formed by the combinations of the elements cobalt-molybdenum, nickel-molybdenum, nickel-tungsten or nickel-cobalt-molybdenum, or nickel-molybdenum-tungsten.

In the case where substantial hydrodesulfurization or hydrodeazotization activity or substantial hydrogenation activity on aromatics is desired, the hydrogenating function is advantageously provided by the combination of nickel and molybdenum; a combination of nickel and tungsten in the presence of molybdenum may also be advantageous. In the case of feedstocks such as vacuum distillates or heavier distillates, combinations of cobalt-nickel-molybdenum type may be advantageously used.

The total content of Group VIB and Group VIII elements is advantageously greater than 6% by weight expressed as oxide relative to the total weight of the catalyst.

The content of Group VIB element is between 5% and 40% by weight, preferably between 8% and 35% by weight, and more preferably between 10% and 30% by weight expressed as Group VIB metal oxide relative to the total weight of the catalyst.

The content of Group VIII element is between 1% and 10% by weight, preferably between 1.5% and 9% by weight, and more preferably between 2% and 8% by weight expressed as Group VIII metal oxide relative to the total weight of the catalyst.

The mole ratio of Group VIII element to Group VIB element in the catalyst is preferentially between 0.1 and 0.8, preferably between 0.15 and 0.6 and even more preferably between 0.2 and 0.5.

The catalyst according to the invention advantageously also comprises phosphorus as dopant. The dopant is an added element which in itself has no catalytic nature but which increases the catalytic activity of the active phase.

The phosphorus content in said catalyst is preferably between 0.1% and 20% by weight expressed as $P_2O_5$ relative to the total weight of the catalyst, preferably between 0.2% and 15% by weight expressed as $P_2O_5$, and very preferably between 0.3% and 11% by weight expressed as $P_2O_5$.

The mole ratio of phosphorus to the Group VIB element in the catalyst is greater than or equal to 0.05, preferably greater than or equal to 0.07, preferably between 0.08 and 1, preferably between 0.1 and 0.9 and very preferably between 0.15 and 0.8.

The catalyst according to the invention, with or without phosphorus, may advantageously also contain at least one dopant chosen from boron, fluorine and a mixture of boron and fluorine.

When the catalyst contains boron or fluorine or a mixture of boron and fluorine, the content of boron or fluorine or a mixture of the two is preferably between 0.1% and 10% by weight expressed as boron and/or fluorine oxide relative to the total weight of the catalyst, preferably between 0.2% and 7% by weight and very preferably between 0.2% and 5% by weight.

The catalyst according to the invention comprises a support based on alumina or silica or silica-alumina.

When the support for said catalyst is based on alumina, it contains more than 50% by weight of alumina relative to the total weight of the support and, in general, it contains only alumina or silica-alumina as defined below.

Preferably, the support comprises alumina, and preferably extruded alumina. Preferably, the alumina is gamma alumina.

The alumina support advantageously has a total pore volume of between 0.1 and 1.5 cm$^3 \cdot$g$^{-1}$, preferably between 0.4 and 1.1 cm$^3 \cdot$g$^{-1}$. The total pore volume is measured by mercury porosimetry according to the standard ASTM D4284 with a wetting angle of 140°, as described in the book by Rouquerol F.; Rouquerol J.; Singh K., "Adsorption by Powders & Porous Solids: Principle, methodology and applications", Academic Press, 1999, for example by means of a Micromeritics™ brand Autopore III™ model machine.

The specific surface area of the alumina support is advantageously between 5 and 400 m$^2 \cdot$g$^{-1}$, preferably between 10 and 350 m$^2 \cdot$g$^{-1}$, more preferably between 40 and 350 m$^2 \cdot$g$^{-1}$. The specific surface area is determined in the present invention by the BET method according to the standard ASTM D3663, method described in the same book cited above.

In another preferred case, the support for said catalyst is a silica-alumina containing at least 50% by weight of alumina relative to the total weight of the support. The silica content in the support is at most 50% by weight relative to the total weight of the support, usually less than or equal to 45% by weight, preferably less than or equal to 40%.

Sources of silicon are well known to those skilled in the art. Examples that may be mentioned include silicic acid, silica in powder form or in colloidal form (silica sol) and tetraethyl orthosilicate Si(OEt)$_4$.

When the support for said catalyst is based on silica, it contains more than 50% by weight of silica relative to the total weight of the support and, generally, it contains only silica.

According to a particularly preferred variant, the support consists of alumina, silica or silica-alumina.

The support may also advantageously further contain from 0.1% to 50% by weight of zeolite relative to the total weight of the support. In this case, any source of zeolite and any associated preparation method known to those skilled in the art may be incorporated. Preferably, the zeolite is chosen from the group FAU, BEA, ISV, IWR, IWW, MEI, UWY and preferably, the zeolite is chosen from the group FAU and BEA, such as Y and/or beta zeolite, and particularly preferably such as the USY and/or beta zeolite.

The support may also contain at least a portion of the VIB and VIII metal(s), and/or at least a portion of the dopant(s) including phosphorus and/or at least a portion of the organic compound(s) containing oxygen (the compound of formula (I) or other compound) and/or nitrogen and/or sulfur which have been introduced independently of the impregnations (for example introduced during the preparation of the support).

The support is advantageously in the form of beads, extrudates, pellets or irregular and nonspherical agglomerates, the specific shape of which may result from a crushing step.

The catalyst according to the invention also comprises at least one compound of formula (I)

in which:

R$_1$ is a saturated or unsaturated, linear, branched or cyclic hydrocarbon-based radical comprising from 1 to 12 carbon atoms, R$_2$ and R$_3$ are chosen from a hydrogen atom and a saturated or unsaturated, linear, branched or cyclic hydrocarbon-based radical comprising from 1 to 12 carbon atoms, X is chosen from an oxygen atom or a sulfur atom, except when R$_2$ and R$_3$ represent a hydrogen atom, in which case X is an oxygen atom, Y is chosen from a hydrogen atom, a saturated or unsaturated, linear, branched or cyclic hydrocarbon-based radical comprising from 1 to 12 carbon atoms or a unit —C(O)R$_4$, R$_4$ being chosen from a hydrogen atom and a saturated or unsaturated, linear, branched or cyclic hydrocarbon-based radical comprising from 1 to 12 carbon atoms.

According to a preferred variant, R$_1$ is a saturated or unsaturated, linear, branched or cyclic hydrocarbon-based radical comprising from 1 to 4 carbon atoms.

According to a preferred embodiment, R$_2$ and R$_3$ are chosen from a hydrogen atom and a saturated or unsaturated, linear, branched or cyclic hydrocarbon-based radical comprising from 1 to 4 carbon atoms.

According to a preferred variant, Y is chosen from a hydrogen atom, a saturated or unsaturated, linear, branched or cyclic hydrocarbon-based radical comprising from 1 to 4 carbon atoms or a unit —C(O)R$_4$, R$_4$ being chosen from a hydrogen atom and a saturated or unsaturated, linear, branched or cyclic hydrocarbon-based radical comprising from 1 to 4 carbon atoms.

According to one variant, the compound of formula (I) is chosen from methyl lactate, ethyl lactate, propyl lactate, butyl lactate, isobutyl lactate, isopentyl lactate, cis-3-hexenyl lactate, L-menthyl lactate, butyl butyryl lactate, ethyl 2-mercaptopropanoate, methyl glycolate, ethyl glycolate, butyl glycolate, ethyl ethoxyacetate, ethyl α-hydroxyisobutanoate, tert-butyl α-hydroxyisobutanoate, ethyl 2-hydroxycaproate and ethyl 2-hydroxyvalerate.

According to another variant, R$_2$ represents a methyl radical and R$_3$ represents a hydrogen atom.

According to one variant, the compound of formula (I) is chosen from butyl lactate and butyl butyryl lactate, which correspond, respectively, to formulae (a) and (b) below:

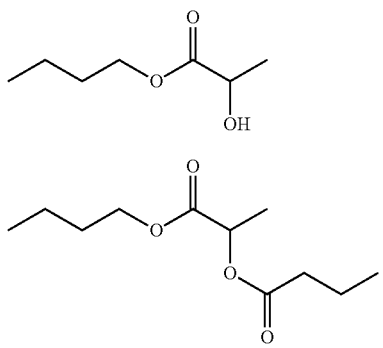

The presence of at least one compound of formula (I) on the catalyst makes it possible to observe increased activity relative to the known catalysts that are not additive-impregnated and the known additive-impregnated dried catalysts. The catalyst may comprise one or more compounds of formula (I), in particular two compounds of formula (I). The content of compound(s) of formula (I) on the catalyst according to the invention is between 1% and 45% by weight, preferably between 2% and 30% by weight and more preferably between 3% and 25% by weight relative to the total weight of the catalyst. During the preparation of the catalyst requiring a drying step, the drying step(s) consecutive to the introduction of the compound of formula (I) are performed at a temperature below 200° C. so as preferably to conserve at least 30%, preferably at least 50% and very preferably at least 70% of the amount of the compound of formula (I) introduced, calculated on the basis of the carbon remaining on the catalyst.

The compound of formula (I) may be derived from the conventional chemical industry with generally high purities.

The catalyst according to the invention may comprise, in addition to the compound of formula (I), another organic compound or a group of organic compounds known for their role as additives. The function of the additives is to increase the catalytic activity relative to catalysts without additives. More particularly, the catalyst according to the invention may also comprise one or more oxygen-based organic compounds other than the compound of formula (I) and/or one or more nitrogen-based organic compounds and/or one or more sulfur-based organic compounds. Preferably, the catalyst according to the invention may also comprise one or more oxygen-based organic compounds other than the compound of formula (I) and/or one or more nitrogen-based organic compounds. Preferably, the organic compound contains at least two carbon atoms and at least one oxygen and/or nitrogen atom.

Generally, the organic compound is chosen from a compound including one or more chemical functions chosen from carboxylic, alcohol, thiol, thioether, sulfone, sulfoxide, ether, aldehyde, ketone, ester, carbonate, amine, nitrile, imide, oxime, urea and amide functions or even the compounds including a furan ring or even sugars.

The oxygen-based organic compound may be one or more chosen from compounds including one or more chemical functions chosen from carboxylic, alcohol, ether, aldehyde, ketone, ester and carbonate functions or even compounds including a furan ring or even sugars. By way of example, the oxygen-based organic compound may be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, maleic acid, malic acid, malonic acid, oxalic acid, gluconic acid, tartaric acid, citric acid, γ-ketovaleric acid, a C1-C4 dialkyl succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, γ-valerolactone, 2-acetylbutyrolactone, propylene carbonate, 2-furaldehyde (also known as furfural), 5-hydroxymethylfurfural (also known as 5-(hydroxymethyl)-2-furaldehyde or 5-HMF), 2-acetylfuran, 5-methyl-2-furaldehyde, methyl 2-furoate, furfuryl alcohol (also known as furfuranol), furfuryl acetate, ascorbic acid, ethyl 3-hydroxybutanoate, ethyl 3-ethoxypropanoate, 2-ethoxyethyl acetate, 2-butoxyethyl acetate, 2-hydroxyethyl acrylate, 2-hydroxyethyl methacrylate, 1,5-pentanediol, 3-methyl-1,5-pentanediol, 1,5-hexanediol, 3-ethyl-1,5-pentanediol, 2,4-diethyl-1,5-pentanediol and 5-methyl-2(3H)-furanone.

The nitrogen-based organic compound may be one or more chosen from compounds including one or more chemical functions chosen from amine and nitrile functions. By way of example, the nitrogen-based organic compound may be one or more chosen from the group consisting of ethylenediamine, diethylenetriamine, hexamethylenediamine, triethylenetetramine, tetraethylenepentamine, pentaethylenehexamine, acetonitrile, octylamine, guanidine or a carbazole.

The organic compound containing oxygen and nitrogen may be one or more chosen from compounds including one or more chemical functions chosen from carboxylic, alcohol, ether, aldehyde, ketone, ester, carbonate, amine, nitrile, imide, amide, urea and oxime functions. By way of example, the organic compound containing oxygen and nitrogen may be one or more chosen from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DPTA), tetramethylurea, glutamic acid, dimethylglyoxime, bicin, tricin, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-based organic compound may be one or more chosen from compounds including one or more chemical functions chosen from thiol, thioether, sulfone and sulfoxide functions. By way of example, the sulfur-based organic compound may be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, methyl 3-(methylthio)propanoate and ethyl 3-(methylthio)propanoate.

Preferably, the oxygen-based organic compound is preferably chosen from γ-valerolactone, 2-acetylbutyrolactone, triethylene glycol, diethylene glycol, ethylene glycol, ethylenediaminetetraacetic acid (EDTA), maleic acid, malonic acid, citric acid, gluconic acid, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicin, tricin, 2-furaldehyde (also known as furfural), 5-hydroxymethylfurfural (also known as 5-(hydroxymethyl)-2-furaldehyde or 5-HMF), 2-acetylfuran, 5-methyl-2-furaldehyde, ascorbic acid, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

When it is/they are present, the content of additive-impregnated functionalized organic compound(s) containing oxygen (other than the compound of formula (I)) and/or nitrogen and/or sulfur on the catalyst according to the invention is between 1% and 30% by weight, preferably between 1.5% and 25% by weight and more preferably between 2% and 20% by weight relative to the total weight of the catalyst.

Preparation Process

The catalyst according to the invention may be prepared according to any method for preparing a supported catalyst that is additive-impregnated with an organic compound known to those skilled in the art.

According to a first variant, the catalyst according to the invention may be prepared by performing a step of impregnating with said compound of formula (I), advantageously by means of a solution containing a solvent in which the compound of formula (I) is diluted. According to this variant, the process for preparing said catalyst involves a step of adding said compound of formula (I) via the liquid phase. After impregnation, a drying step is then necessary to remove the solvent and/or the excess compound of formula (I) and thus free the porosity needed for the use of the catalyst.

According to a second and third variants, the catalyst according to the invention may be prepared by performing a step of adding said compound of formula (I) via the gaseous phase. These variants are described hereinbelow.

Introduction of the Compound of Formula (I) Via the Liquid Phase

According to the first variant, the catalyst according to the invention may be prepared according to a preparation process comprising the following steps:
a) a compound including a Group VIB element, at least one compound including a Group VIII element, at least one compound of formula (I) and optionally phosphorus are placed in contact with a support based on alumina or silica or silica-alumina, or a regenerated catalyst containing a support based on alumina or silica or silica-alumina, at least one Group VIB element, at least one Group VIII element and optionally phosphorus are placed in contact with at least one compound of formula (I), so as to obtain a catalyst precursor,
b) said catalyst precursor derived from step a) is dried at a temperature below 200° C., without subsequently calcining it.

According to this variant, the process for preparing a fresh catalyst will be described first, and the process for preparing a rejuvenated catalyst will then be described thereafter.

I) Process for Preparing a Fresh Catalyst

Step a) of placing in contact includes several embodiments which differ notably by the moment of introduction of the compound of formula (I), which may be performed either at the same time as the impregnation of the metals (co-impregnation) or after the impregnation of the metals (post-impregnation), or, finally, before the impregnation of the metals (pre-impregnation). Furthermore, the step of placing in contact may combine at least two embodiments, for example co-impregnation and post-impregnation. These various embodiments will be described hereinbelow. Each embodiment, taken alone or in combination, may proceed in one or more steps.

It is important to point out that the catalyst according to the invention, during its preparation process, does not undergo any calcination after the introduction of the compound of formula (I) or of any other organic compound containing oxygen and/or nitrogen and/or sulfur, so as to at least partly preserve the compound of formula (I) or any other organic compound in the catalyst. The term "calcination" means herein a thermal treatment under a gas containing air or oxygen at a temperature of greater than or equal to 200° C.

However, the catalyst precursor may undergo a calcination step before the introduction of the compound of formula (I) or of any other organic compound containing oxygen and/or nitrogen and/or sulfur, notably after the impregnation of the Group VIB and VIII elements (post-impregnation) optionally in the presence of phosphorus and/or of another dopant or during regeneration of an already-used catalyst. The hydrogenating function comprising the Group VIB and Group VIII elements of the catalyst according to the invention, also known as the active phase, is then in an oxide form.

According to another variant, the catalyst precursor does not undergo any calcination step after the impregnation of the Group VIB and VIII elements (post-impregnation), it is simply dried. The hydrogenating function comprising the Group VIB and Group VIII elements of the catalyst according to the invention, also known as the active phase, is then not in an oxide form.

Irrespective of the embodiment, step a) of placing in contact generally involves at least one impregnation step, preferably a dry impregnation step, in which the support is impregnated with an impregnation solution comprising at least one Group VIB element, at least one Group VIII element and optionally phosphorus. In the case of the co-impregnation described below in detail, this impregnation solution also comprises at least one compound of formula (I). The Group VIB and Group VIII elements are generally introduced by impregnation, preferentially by dry impregnation or by impregnation in an excess of solution. Preferably, the total amount of the Group VIB and Group VIII elements is introduced by impregnation, preferably by dry impregnation, irrespective of the embodiment.

The Group VIB and Group VIII elements may also be partly introduced during the forming of said support at the moment of blending with at least one alumina gel chosen as matrix, the rest of the hydrogenating elements then being introduced subsequently by impregnation. Preferably, when the Group VIB and Group VIII elements are partly introduced at the moment of blending, the proportion of Group VIB element introduced during this step is less than 5% by weight of the total amount of Group VIB element introduced onto the final catalyst.

Preferably, the Group VIB element is introduced at the same time as the Group VIII element, irrespective of the introduction method.

The molybdenum precursors that may be used are well known to those skilled in the art. For example, among the sources of molybdenum, use may be made of oxides and hydroxides, molybdic acids and salts thereof, in particular the ammonium salts such as ammonium molybdate, ammonium heptmolybdate, phosphomolybdic acid ($H_3PMo_{12}O_{40}$) and salts thereof, and optionally silicomolybdic acid ($H_4SiMo_{12}O_{40}$) and salts thereof. The sources of molybdenum may also be heteropolycompounds of Keggin, lacunar Keggin, substituted Keggin, Dawson, Anderson or Strandberg type, for example. Molybdenum trioxide and heteropolyanions of Keggin, lacunar Keggin or substituted Keggin type are preferably used.

The tungsten precursors that may be used are also well known to those skilled in the art. For example, among the sources of tungsten, use may be made of oxides and hydroxides, tungstic acids and salts thereof, in particular the ammonium salts such as ammonium tungstate, ammonium metatungstate, phosphotungstic acid and salts thereof, and optionally silicotungstic acid ($H_4SiW_{12}O_{40}$) and salts thereof. The sources of tungsten may also be heteropolycompounds of Keggin, lacunar Keggin, substituted Keggin or Dawson type, for example. Oxides and ammonium salts such as ammonium metatungstate or heteropolyanions of Keggin, lacunar Keggin or substituted Keggin type are preferably used.

The precursors of the Group VIII elements that may be used are advantageously chosen from oxides, hydroxides, hydroxycarbonates, carbonates and nitrates of Group VIII elements. For example, nickel hydroxycarbonate or cobalt carbonate or hydroxide are preferably used.

Phosphorus, when it is present, may be totally or partially introduced by impregnation. Preferably, it is introduced by impregnation, preferably dry impregnation, by means of a solution containing the precursors of the Group VIB and Group VIII elements.

Said phosphorus may be advantageously introduced alone or as a mixture with at least one of the Group VIB and Group VIII elements, and this may be done in any of the steps of impregnation of the hydrogenating function if said function is introduced in several portions. Said phosphorus may also be introduced, totally or partially, during the impregnation of the compound of formula (I) if the latter is introduced separately of the hydrogenating function (in the post-impregnation and pre-impregnation cases described later) and this may be done in the presence or absence of an organic compound other than the compound of formula (I) containing oxygen and/or nitrogen and/or sulfur. It may also be introduced at the stage of synthesis of the support, at any step in the synthesis thereof. It may thus be introduced before, during or after the blending of the chosen alumina gel matrix, for instance and preferably aluminum oxyhydroxide (boehmite) which is the alumina precursor.

The preferred phosphorus precursor is orthophosphoric acid $H_3PO_4$, but salts and esters thereof such as ammonium phosphates are also suitable for use. The phosphorus may also be introduced at the same time as the Group VIB element(s) in the form of Keggin, lacunar Keggin, substituted Keggin or Strandberg heteropolyanions.

The compound of formula (I) is advantageously introduced into an impregnation solution which, depending on the preparation method, may be the same solution as or a different solution from the one containing the Group VIB and VIII elements, in a total amount corresponding to:
- a mole ratio of the compound of formula (I) to the Group VIB element(s) of the catalyst precursor of between 0.01 to 5 mol/mol, preferably between 0.05 to 3 mol/mol, preferably between 0.05 and 1.5 mol/mol and very preferably between 0.1 and 1 mol/mol, calculated on the basis of the components introduced into the impregnation solution(s), and
- a mole ratio of the compound of formula (I) to the Group VIII element(s) of the catalyst precursor of between 0.02 to 17 mol/mol, preferably between 0.1 to 10 mol/mol, preferably between 0.15 and 5 mol/mol and very preferably between 0.2 and 3.5 mol/mol, calculated on the basis of the components introduced into the impregnation solution(s).

When several compounds of formula (I) are present, the different mole ratios apply for each of the compounds of formula (I) present.

Any impregnation solution described in the present invention may comprise any polar solvent known to those skilled in the art. Said polar solvent used is advantageously chosen from the group formed by methanol, ethanol, water, phenol and cyclohexanol, taken alone or as a mixture. Said polar solvent may also be advantageously chosen from the group formed by propylene carbonate, DMSO (dimethyl sulfoxide), N-methylpyrrolidone (NMP) and sulfolane, taken alone or as a mixture. Preferably, a polar protic solvent is used. A list of common polar solvents and also their dielectric constant can be found in the book "Solvents and Solvent Effects in Organic Chemistry" C. Reichardt, Wiley-VCH, 3rd edition, 2003, pages 472-474. Very preferably, the solvent used is water or ethanol, and particularly preferably, the solvent is water. In one possible embodiment, the solvent may be absent from the impregnation solution, notably during a pre-impregnation or post-impregnation preparation.

When the catalyst also comprises a dopant chosen from boron, fluorine or a mixture of boron and fluorine, the introduction of this (these) dopant(s) may be performed in the same manner as the introduction of phosphorus described above in various steps of the preparation and in various ways.

The boron precursors may be boric acid, orthoboric acid $H_3BO_3$, ammonium diborate or pentaborate, boron oxide or boric esters. The boron may be introduced, for example, by a solution of boric acid in a water/alcohol mixture or in a water/ethanolamine mixture. Preferably, the boron precursor, if boron is introduced, is orthoboric acid.

The fluorine precursors that may be used are well known to those skilled in the art. For example, the fluoride anions may be introduced in the form of hydrofluoric acid or salts thereof. These salts are formed with alkali metals, ammonium or an organic compound. In the latter case, the salt is advantageously formed in the reaction mixture by reaction between the organic compound and hydrofluoric acid. The fluorine may be introduced, for example, by impregnation of an aqueous solution of hydrofluoric acid, or of ammonium fluoride or of ammonium difluoride.

When the catalyst also comprises an additional additive (in addition to the compound of formula (I)) or a group of additional additives chosen from an organic compound other than the compound of formula (I) containing oxygen and/or nitrogen and/or sulfur, it may be introduced into the impregnation solution of step a).

The mole ratio of organic compound(s) containing oxygen and/or nitrogen and/or sulfur to the Group VIB element(s) on the catalyst is between 0.05 and 5 mol/mol, preferably between 0.1 and 4 mol/mol, preferably between 0.2 and 3 mol/mol, calculated on the basis of the components introduced into the impregnation solution(s).

The mole ratio of organic compound(s) containing oxygen and/or nitrogen and/or sulfur to the compound of formula (I) is between 0.05 and 5 mol/mol, preferably between 0.1 and 4 mol/mol, preferably between 0.2 and 3 mol/mol, calculated on the basis of the components introduced into the impregnation solution(s).

When several organic compounds containing oxygen and/or nitrogen and/or sulfur are present, the different mole ratios apply for each of the organic compounds present.

Advantageously, after each impregnation step, the impregnated support is left to mature. Maturation allows the impregnation solution to become homogeneously dispersed within the support.

Any maturation step described in the present invention is advantageously performed at atmospheric pressure, in a water-saturated atmosphere and at a temperature of between 17° C. and 50° C., and preferably at room temperature. Generally, a maturation time of between ten minutes and forty-eight hours, and preferably of between thirty minutes and five hours, is sufficient. Longer periods of time are not ruled out, but do not necessarily afford any improvement.

In accordance with step b) of the preparation process according to the invention, the optionally matured catalyst precursor obtained in step a) is subjected to a step of drying at a temperature below 200° C. without a subsequent calcination step.

Any drying step subsequent to the introduction of the compound of formula (I) described in the present invention is performed at a temperature below 200° C., preferably between 50 and 180° C., preferably between 70 and 150° C. and very preferably between 75 and 130° C.

The drying step is advantageously performed via any technique known to those skilled in the art. It is advantageously performed at atmospheric pressure or at reduced pressure and preferably at atmospheric pressure. It is advantageously performed in a crossed bed using hot air or any other hot gas. Preferably, when the drying is performed in a fixed bed, the gas used is either air, or an inert gas such as argon or nitrogen. Very preferably, the drying is performed in a crossed bed in the presence of nitrogen and/or air. Preferably, the drying step has a short duration of between 5 minutes and 4 hours, preferably between 30 minutes and 4 hours and very preferably between 1 hour and 3 hours. The drying is then conducted so as preferentially to keep at least 30% of the compound of formula (I) introduced during an impregnation step; preferably, this amount is greater than 50% and even more preferably greater than 70%, calculated on the basis of the carbon remaining on the catalyst. When an organic compound other than the compound of formula (I) containing oxygen and/or nitrogen and/or sulfur is present, the drying step is performed so as preferably to keep at least 30%, preferably at least 50%, and very preferably at least 70% of the amount introduced, calculated on the basis of carbon remaining on the catalyst.

On conclusion of the drying step b), a dried catalyst is obtained, which is not subjected to any subsequent calcination step.

Co-Impregnation

According to a first embodiment of step a) of the process for preparing the (fresh) catalyst, said compounds comprising the Group VIB and Group VIII elements, the compound of formula (I) and optionally phosphorus are deposited on said support, via one or more co-impregnation steps, i.e. said compounds comprising the Group VIB and Group VIII elements, the compound of formula (I) and optionally phosphorus are introduced simultaneously into said support ("co-impregnation").

Post-Impregnation

According to a second embodiment of step a) of the process for preparing the (fresh) catalyst according to the invention, at least one compound of formula (I) is placed in contact with a dried and optionally calcined impregnated support comprising at least one Group VIB element, at least one Group VIII element and optionally phosphorus, said support being based on alumina or silica or silica-alumina, so as to obtain a catalyst precursor.

This second embodiment is a "post-impregnation" preparation of the compound of formula (I).

The introduction of the Group VIB and Group VIII elements and optionally of phosphorus onto the support may be advantageously performed via one or more impregnations with an excess of solution on the support, or preferably via one or more dry impregnations, and, preferably, via only one dry impregnation of said support, using solution(s), preferably aqueous solution(s), containing the metal precursor(s) and preferably the phosphorus precursor.

When several impregnation steps are performed, each impregnation step is preferably followed by an intermediate drying step at a temperature below 200° C. Each intermediate drying step, prior to the introduction of the compound of formula (I), may be followed by a step of calcination.

The calcination is generally performed at a temperature of between 200° C. and 900° C., preferably between 250° C. and 750° C. The calcination time is generally between 30 minutes and 16 hours, preferably between 1 hour and 5 hours. It is generally performed in air. Calcination enables the precursors of the Group VIB and VIII metals to be converted into oxides.

The compound of formula (I) may then advantageously be deposited in one or more steps either by impregnation in excess, or by dry impregnation, or by any other means known to those skilled in the art. Preferably, the compound of formula (I) is introduced by dry impregnation, in the presence or absence of a solvent as described above.

Preferably, the solvent in the impregnation solution is water, which facilitates the implementation at the industrial scale.

The catalyst precursor which has optionally been matured is then subjected to a step of drying at a temperature below 200° C. without a subsequent calcination step, as described above.

Pre-Impregnation

According to a third embodiment of step a) of the process for preparing the (fresh) catalyst according to the invention, at least one compound including a Group VIB element, at least one compound including a Group VIII element, and optionally phosphorus are placed in contact with the support based on alumina or silica or silica-alumina which contains at least one compound of formula (I) so as to obtain a catalyst precursor.

This third embodiment is a "pre-impregnation" preparation of the compound of formula (I). The compound of formula (I) may be introduced at any moment in the preparation of the support, and preferentially during the forming or by impregnation on an already-formed support.

If introduction of the compound of formula (I) onto the preformed support is chosen, then this introduction may be performed as is indicated for the post-impregnation.

If introduction during the forming is chosen, preferably, said forming is performed by extrusion blending, by pelletizing, by the drop coagulation (oil-drop) method, by spinning-plate granulation or via any other method that is well known to those skilled in the art. Very preferably, said forming is performed by extrusion blending, the compound of formula (I) being able to be introduced at any moment in the extrusion blending. The formed material obtained on conclusion of the forming step then advantageously undergoes a step of heat treatment at a temperature such that at least a portion of the compound of formula (I) remains present, preferably at a temperature below 200° C.

The introduction of the Group VIB and Group VIII elements and optionally of phosphorus may then be advantageously performed via one or more impregnations.

The three modes described above may be performed alone as described or combined to give rise to other hybrid preparation modes as a function of the technical and practical constraints.

According to another alternative embodiment, the placing in contact in step a) combines at least two modes of placing in contact, for example the co-impregnation of the Group VIB and Group VIII elements and optionally of phosphorus with an organic compound, followed by drying at a temperature below 200° C., then post-impregnation of an organic compound which may be identical to or different from the one used for the co-impregnation, given that at least one of the organic compounds is a compound of formula (I).

II) Process for Preparing a Rejuvenated Catalyst

The catalyst according to the invention may be a rejuvenated catalyst. The preparation process thereof comprises the following steps:
  a) a regenerated catalyst containing a support based on alumina or silica or silica-alumina, at least one Group VIB element, at least one Group VIII element and optionally phosphorus is placed in contact with at least one compound of formula (I) so as to obtain a catalyst precursor,
  b) said catalyst precursor derived from step a) is dried at a temperature below 200° C., without subsequently calcining it.

The regenerated catalyst is a catalyst which has been used as catalyst in a catalytic unit and notably in hydrotreating and/or hydrocracking and which has been subjected to at least one step of partial or total removal of coke, for example by calcination (regeneration). The regeneration may be performed via any means known to those skilled in the art. The regeneration is generally performed by calcination at temperatures of between 350 and 550° C., and usually between 400 and 520° C., or between 420 and 520° C., or between 450 and 520° C., temperatures below 500° C. often being advantageous.

The regenerated catalyst contains a support based on alumina or silica or silica-alumina, at least one Group VIB element, at least one Group VIII element and optionally phosphorus in the respective proportions indicated above. Following the regeneration, the hydrogenating function comprising the Group VIB and Group VIII elements of the regenerated catalyst is in an oxide form. It may also contain dopants other than phosphorus, as described above.

Preferably, the placing in contact of step a) is performed by impregnation of the regenerated catalyst with an impregnation solution comprising at least one compound of formula (I) so as to obtain a catalyst precursor.

The compound of formula (I) may advantageously be deposited in one or more steps either by impregnation in excess, or by dry impregnation, or by any other means known to those skilled in the art in the same manner as described previously and with the mole ratios per Group VIB or Group VIII element described above.

The operating conditions described above concerning the maturation and drying may, needless to say, be applied in the context of the latter embodiment.

Introduction of the Compound of Formula (I) Via the Gaseous Phase

According to two variants, the fresh catalyst according to the invention may be prepared by performing a step of addition of said compound of formula (I) via the gaseous phase as described in the French patent applications filed under the national numbers 17/53.921 and 17/53.922. According to these variants, the process for preparing said catalyst does not involve a conventional step of impregnation of said compound of formula (I). Consequently, it is not necessary to perform a drying step after introduction of the compound of formula (I).

According to the first of the two variants, the process for preparing the catalyst according to the invention comprises the following steps:
  i) at least one compound of formula (I) is deposited on a support based on alumina or silica or silica-alumina by performing a step in which said support and the furan compound in liquid form are brought together simultaneously and without any physical contact between the support and the compound of formula (I) in liquid form, at a temperature below the boiling point of the compound of formula (I) and under pressure and time conditions such that a fraction of said compound of formula (I) is transferred in gaseous form to the support,
  ii) at least one compound including a Group VIB element, at least one compound including a Group VIII element, and optionally phosphorus are placed in contact with the support based on alumina or silica or silica-alumina,
  iii) the solid obtained on conclusion of step ii) is dried, step i) being performed before or after steps ii) and iii) or during step iii).

This variant is characterized in that the addition of the compound of formula (I) to the support is performed without physical contact with the compound of formula (I) in liquid form, i.e. without impregnation of the support with the liquid. The process is based on the principle of the existence of a vapor pressure of the compound of formula (I) which is generated by its liquid phase at a given temperature and a given pressure. Thus, a portion of the molecules of compound of formula (I) in liquid form passes into the gaseous form (vaporization) and is then transferred (gaseously) to the support. This bringing-together step i) is performed for a time that is sufficient to attain the target content of compound of formula (I) in the support.

Generally, step i) is performed at an absolute pressure of between 0 and 1 MPa.

Preferably, the operating temperature of step i) is below 200° C., preferably between 10° C. and 150° C., more preferably between 25° C. and 120° C.

According to the second of the two variants, the process for preparing the catalyst according to the invention comprises the following steps:
  i') at least one compound of formula (I) is deposited onto a support based on alumina or silica or silica-alumina by performing a step in which the support is brought together, in a closed or open chamber, with a porous solid containing at least one compound of formula (I), this step being performed under temperature, pressure and time conditions such that a fraction of said compound of formula (I) is transferred gaseously from the porous solid to the support,
  ii) at least one compound including a Group VIB element, at least one compound including a Group VIII element, and optionally phosphorus are placed in contact with the support based on alumina or silica or silica-alumina,
  iii) the solid obtained on conclusion of step ii) is dried, step i') being performed separately before or after steps ii) and iii).

According to this second variant, the addition of the compound of formula (I) consists in bringing together, in an open or closed chamber, a first batch of porous solids rich in a compound of formula (I) which has been previously deposited in liquid form onto said solid with a support (second batch of porous solid low in said compound of formula (I)). The object of this bringing together of the porous solids is to enable a gaseous transfer of a portion of the compound of formula (I) contained in the first batch of porous solids to the second batch of porous solids. According to the invention, the term "low in compound of formula (I)" notably covers the case where the second batch of porous solids is free of said compound of formula (I).

This second variant is also based on the principle of the existence of a vapor pressure of the compound of formula (I) at a given temperature and a given pressure. Thus, a portion of the molecules of compound of formula (I) of the batch of porous solids rich in compound of formula (I) passes into gaseous form (vaporization) and is then transferred (gaseously) to the support (solid low in compound of formula (I)). According to the invention, the porous solid rich in compound of formula (I) acts as a source of compound of formula (I) for enriching with compound of formula (I) the support (porous solid low in compound of formula (I)).

The porous solid rich in compound of formula (I) is advantageously a porous support, preferably a support based on alumina or silica or silica-alumina, which may contain at least one Group VIB element, at least one Group VIII element and optionally phosphorus.

The (first batch of solids rich in compound of formula (I))/(support or second batch of solids low in compound of formula (I)) mass ratio depends on the pore distribution of the solids and on the objective in terms of targeted amount of compound of formula (I) on the solids derived from the bringing-together step i'). This mass ratio is generally less than or equal to 10, preferably less than 2 and even more preferably between 0.05 and 1, limits included.

The step of bringing together the batches of porous solids is preferably performed under controlled temperature and pressure conditions and so that the temperature is below the boiling point of said compound of formula (I) to be transferred gaseously. Preferably, the operating temperature is below 150° C. and the absolute pressure is generally between 0 and 1 MPa, preferably between 0 and 0.5 MPa and more preferably between 0 and 0.2 MPa. It will thus be possible to perform the bringing-together step in an open or closed chamber, optionally with control of the composition of the gas present in the chamber.

When the step of bringing together the porous solids takes place in an open chamber, it will be ensured that the entrainment of the compound of formula (I) out of the chamber is limited as much as possible. Alternatively, the step of bringing together the porous solids may be performed in a closed chamber, for example in a container for storing or transporting the solid that is impermeable to gas exchanges with the external environment.

The term "bringing together" denotes the fact that the solids are present at the same time in the chamber without there necessarily being any physical contact of the two batches of solids.

The term "rich in compound of formula (I)" reflects the fact that the solid contains more than 50% of the total amount of said compound of formula (I) used in step i'), preferably at least 60%, preferably at least 80%, preferably at least 90% and preferably 100%. According to one embodiment, at the start of step I'), the porous solid rich in compound of formula (I) contains 100% of the total amount used in step i') and the support (second batch of solids low in compound of formula (I)) therefore contains 0% of the total amount of said compound of formula (I).

The two variants for preparation of the (fresh) catalyst via the gaseous phase may be performed according to two embodiments.

According to a first embodiment, the active phase is introduced first, said active phase comprising at least one compound including a Group VIB element, at least one compound including a Group VIII element and optionally phosphorus on a porous support (step ii), it is then dried (step iii), then the dried support containing the active metal phase and optionally phosphorus is treated in step i) or i') of bringing together with at least one compound of formula (I) in liquid form or a porous solid containing at least one compound of formula (I) so as to provide a catalyst that is additive-impregnated with said compound of formula (I). According to one variant of this first embodiment, step i) is performed at the same time as step iii).

According to another embodiment, the support is firstly subjected to a step of adding the compound of formula (I) so as to provide a catalyst support additive-impregnated with the organic compound (step i) or i')), which, after an optional maturation phase, is sent to the step of impregnation of the active phase (step ii), then to drying (step iii).

In the two embodiments, the porous support may notably already contain an additional organic compound other than the compound of formula (I). Likewise, this additional organic compound can be introduced with the solution containing the active metal phase and optionally the phosphorus.

According to two other variants, the step of adding said compound of formula (I) via the gaseous phase may also be performed on a regenerated catalyst.

According to these two variants, the process for preparing the catalyst according to the invention comprises the following steps:

i") at least one compound of formula (I) is deposited on a regenerated catalyst containing a support based on alumina or silica or silica-alumina, at least one Group VIB element, at least one Group VIII element and optionally phosphorus, by performing a step in which said regenerated catalyst and at least one compound of formula (I) in liquid form are brought together simultaneously and without any physical contact between the regenerated catalyst and the compound of formula (I) in liquid form, at a temperature below the boiling point of the compound of formula (I) and under pressure and time conditions such that a fraction of said compound of formula (I) is transferred in gaseous form to the regenerated catalyst, or i''') at least one compound of formula (I) is deposited onto a regenerated catalyst containing a support based on alumina or silica or silica-alumina, at least one Group VIB element, at least one Group VIII element and optionally phosphorus, by performing a step in which the regenerated catalyst is brought together, in a closed or open chamber, with a porous solid containing at least one compound of formula (I), this step being performed under temperature, pressure and time conditions such that a fraction of said compound of formula (I) is transferred gaseously from the porous solid to the regenerated catalyst.

The fresh or rejuvenated additive-impregnated catalyst obtained by introduction of the compound of formula (I) in the gaseous phase as described above may also be treated with one or more subsequent steps in order to incorporate one or more other additional organic compounds different from the one used in step i), i'), i") or i"'). The incorporation of one or more other additional different organic compounds may be performed by means of gaseous-phase addition processes or according to any other method known to those skilled in the art, for instance by impregnation of a solution containing the additional organic compound.

Sulfurization

Before its use for the hydrotreating and/or hydrocracking reaction, it is advantageous to transform the catalyst obtained according to one of the modes of introduction described in the present invention into a sulfurized catalyst in order to form its active species. This activation or sulfurization step is performed via the methods that are well known to those skilled in the art, and advantageously under a sulfo-reductive atmosphere in the presence of hydrogen and hydrogen sulfide.

On conclusion of step b) according to the various modes of preparation of the process according to the invention, said catalyst obtained is thus advantageously subjected to a sulfurization step, without an intermediate calcination step.

Said dried catalyst is advantageously sulfurized ex situ or in situ. The sulfurizing agents are $H_2S$ gas, elemental sulfur, $CS_2$, mercaptans, sulfides and/or polysulfides, hydrocarbon fractions with a boiling point lower than 400° C. and containing sulfur compounds or any other sulfur-based compound used for the activation of hydrocarbon feedstocks for the purpose of sulfurizing the catalyst. Said sulfur-based compounds are advantageously chosen from alkyl disulfides, for instance dimethyl disulfide (DMDS), alkyl sulfides, for instance dimethyl sulfide, thiols, for instance n-butyl mercaptan (or 1-butanethiol) and polysulfide compounds of tert-nonyl polysulfide type. The catalyst may also be sulfurized by the sulfur contained in the feedstock to be desulfurized. Preferably, the catalyst is sulfurized in situ in the presence of a sulfurizing agent and of a hydrocarbon-based feedstock. Very preferably, the catalyst is sulfurized in situ in the presence of a hydrocarbon-based feedstock additive-impregnated with dimethyl disulfide.

Hydrotreating and/or Hydrocracking Process

Finally, another subject of the invention is the use of the catalyst according to the invention or prepared according to the preparation process according to the invention in processes for the hydrotreating and/or hydrocracking of hydrocarbon-based fractions.

The catalyst according to the invention, and which has preferably undergone a sulfurized step beforehand, is advantageously used for the hydrotreating and/or hydrocracking reactions of hydrocarbon-based feedstocks such as petroleum fractions, fractions derived from coal or hydrocarbons produced from natural gas, optionally as mixtures or else from a hydrocarbon-based fraction derived from biomass and more particularly for hydrogenation, hydrodeazotization, hydrodearomatization, hydrodesulfurization, hydrodeoxygenation, hydrodemetallation or hydroconversion reactions of hydrocarbon-based feedstocks.

In these uses, the catalyst according to the invention, and which has preferably undergone a sulfurization step beforehand, has improved activity relative to the catalysts of the prior art. This catalyst may also advantageously be used in the pretreatment of catalytic cracking or hydrocracking feedstocks, or the hydrodesulfurization of residues or the forced hydrodesulfurization of gas oils (ULSD: ultra-low-sulfur diesel).

The feedstocks used in the hydrotreating process are, for example, gasolines, gas oils, vacuum gas oils, atmospheric residues, vacuum residues, atmospheric distillates, vacuum distillates, heavy fuel oils, oils, waxes and paraffins, used oils, deasphalted residues or crudes, feedstocks originating from thermal or catalytic conversion processes, lignocellulosic feedstocks, or, more generally, feedstocks derived from biomass, taken alone or as a mixture. The feedstocks that are treated, and in particular those mentioned above, generally contain heteroatoms such as sulfur, oxygen and nitrogen and, for heavy feedstocks, they usually also contain metals.

The operating conditions used in the processes involving reactions for hydrotreating hydrocarbon feedstocks described above are generally the following: the temperature is advantageously between 180° C. and 450° C., and preferably between 250° C. and 440° C., the pressure is advantageously between 0.5 and 30 MPa, and preferably between 1 and 18 MPa, the hourly space velocity is advantageously between 0.1 and 20 $h^{-1}$ and preferably between 0.2 and 5 $h^{-1}$, and the hydrogen/feedstock ratio expressed as the volume of hydrogen, measured under normal temperature and pressure conditions, per volume of liquid feedstock is advantageously between 50 l/l to 5000 l/l and preferably 80 to 2000 l/l.

According to a first mode of use, said hydrotreating process according to the invention is a process for the hydrotreating, and notably for the hydrodesulfurization (HDS), of a gas oil fraction performed in the presence of at least one catalyst according to the invention. Said hydrotreating process according to the invention is directed toward removing the sulfur-based compounds present in said gas oil fraction so as to meet the environmental standards in force, namely a permitted sulfur content of up to 10 ppm. It also makes it possible to reduce the contents of aromatics and of nitrogen of the gas oil fraction to be hydrotreated.

Said gas oil fraction to be hydrotreated according to the process of the invention contains from 0.02% to 5.0% by weight of sulfur. It is advantageously derived from the straight-run distillation (or the straight-run gas oil) of a coking unit, of a visbreaking unit, of a steam cracking unit, of a unit for hydrotreating and/or hydrocracking heavier feedstocks and/or of a catalytic cracking unit (fluid catalytic cracking). Said gas oil fraction preferentially contains at least 90% of compounds with a boiling point between 250° C. and 400° C. at atmospheric pressure.

The process for hydrotreating said gas oil fraction according to the invention is performed under the following operating conditions: a temperature of between 200 and 400° C., preferentially between 300 and 380° C., a total pressure of between 2 MPa and 10 MPa and more preferentially between 3 MPa and 8 MPa with a ratio of the volume of hydrogen per volume of hydrocarbon-based feedstock, expressed as volume of hydrogen, measured under normal temperature and pressure conditions, per volume of liquid feedstock, of between 100 and 600 liters per liter and more preferentially between 200 and 400 liters per liter, and an hourly space velocity (HSV) of between 1 and 10 $h^{-1}$, preferentially between 2 and 8 $h^{-1}$. The HSV corresponds to the inverse of the contact time expressed in hours and is defined by the ratio of the volume flow rate of liquid hydrocarbon-based feedstock per volume of catalyst loaded into the reaction unit performing the hydrotreating process according to the invention. The reaction unit performing the process for hydrotreating said gas oil fraction according to the invention is preferentially performed in a fixed bed, in a moving bed or in a boiling bed, preferably in a fixed bed.

According to a second mode of use, said hydrotreating and/or hydrocracking process according to the invention is a process for the hydrotreating (notably hydrodesulfurization, hydrodeazotization, hydrogenation of aromatics) and/or hydrocracking of a vacuum distillate fraction performed in the presence of at least one catalyst according to the invention. Said hydrotreating and/or hydrocracking process, also referred to as hydrocracking pretreatment or hydrocracking process according to the invention, is directed, depending on the case, toward removing the sulfur-based, nitrogen-based or aromatic compounds present in said distillate fraction so as to perform a pretreatment before conversion in catalytic cracking or hydroconversion processes, or toward hydrocracking the distillate fraction which may optionally have been pretreated beforehand, if necessary.

Very varied feedstocks may be treated via the vacuum distillate hydrotreating and/or hydrocracking processes described above. Generally, they contain at least 20% by volume and often at least 80% by volume of compounds boiling above 340° C. at atmospheric pressure. The feedstock may be, for example, vacuum distillates and also feedstocks derived from units for extraction of aromatics from lubricant oil bases or derived from the solvent deparaffining of lubricant oil bases, and/or of deasphalted oils, or the feedstock may be a deasphalted oil or paraffins derived from the Fischer-Tropsch process, or any mixture of the feedstocks mentioned previously. In general, the feedstocks have a T5 boiling point above 340° C. at atmospheric pressure, and better still above 370° C. at atmospheric pressure, i.e. 95% of the compounds present in the feedstock have a boiling point above 340° C. and better still above 370° C. The nitrogen content of the feedstocks treated in the processes according to the invention is usually greater than 200 ppm by weight, preferably between 500 and 10 000 ppm by weight. The sulfur content of the feedstocks treated in the processes according to the invention is usually between 0.01% and 5.0% by weight. The feedstock may optionally contain metals (for example nickel and vanadium). The asphaltene content is generally less than 3000 ppm by weight.

The hydrotreating and/or hydrocracking catalyst is generally placed in contact, in the presence of hydrogen, with the feedstocks described previously, at a temperature above 200° C., usually between 250° C. and 480° C., advantageously between 320° C. and 450° C., preferably between 330° C. and 435° C., at a pressure above 1 MPa, usually between 2 and 25 MPa, preferably between 3 and 20 MPa, the space velocity being between 0.1 and 20.0 h$^{-1}$ and preferably 0.1-6.0 h$^{-1}$, preferably 0.2-3.0 h$^{-1}$, and the amount of hydrogen introduced is such that the volume ratio of a liter of hydrogen/liter of hydrocarbon, expressed as volume of hydrogen, measured under normal temperature and pressure conditions, per volume of liquid feedstock, is between 80 and 5000 l/l and usually between 100 and 2000 l/l. These operating conditions used in the processes according to the invention generally make it possible to obtain conversions per pass, into products having boiling points of less than 340° C. at atmospheric pressure, and better still less than 370° C. at atmospheric pressure, of greater than 15% and even more preferably between 20% and 95%.

The vacuum distillate hydrotreating and/or hydrocracking processes using the catalysts according to the invention cover pressure ranges and conversion ranges extending from mild hydrocracking to high-pressure hydrocracking. The term "mild hydrocracking" refers to hydrocracking which leads to moderate conversions, generally of less than 40%, and which operates at low pressure, preferably between 2 MPa and 6 MPa.

The catalyst according to the invention may be used alone, in one or more fixed-bed catalytic beds, in one or more reactors, in a "one-step" hydrocracking scheme, with or without liquid recycling of the unconverted fraction, or in a "two-step" hydrocracking scheme, optionally in combination with a hydrorefining catalyst located upstream of the catalyst of the present invention.

According to a third mode of use, said hydrotreating and/or hydrocracking process according to the invention is advantageously performed as a pretreatment in a fluidized-bed catalytic cracking (or FCC: fluid catalytic cracking) process. The operating conditions of the pretreatment in terms of temperature range, pressure, hydrogen recycling rate and hourly space velocity are generally identical to those described above for the vacuum distillate hydrotreating and/or hydrocracking processes. The FCC process may be conducted in a conventional manner known to those skilled in the art under suitable cracking conditions for the purpose of producing hydrocarbon-based products of smaller molecular weight. A summary description of catalytic cracking will be found, for example, in Ullmann's Encyclopedia of Industrial Chemistry volume A18, 1991, pages 61 to 64.

According to a fourth mode of use, said hydrotreating and/or hydrocracking process according to the invention is a process for the hydrotreating (notably for the hydrodesulfurization) of a gasoline fraction in the presence of at least one catalyst according to the invention.

Unlike other hydrotreating processes, the hydrotreating (notably the hydrodesulfurization) of gasolines must make it possible to address a twofold conflicting constraint: ensuring in-depth hydrodesulfurization of the gasolines and limiting the hydrogenation of the unsaturated compounds present so as to limit the loss of octane number.

The feedstock is generally a hydrocarbon fraction with a distillation range of between 30 and 260° C. Preferably, this hydrocarbon fraction is a fraction of the gasoline type. Very preferably, the gasoline fraction is an olefinic gasoline fraction derived, for example, from a catalytic cracking unit (fluid catalytic cracking).

The hydrotreating process consists in placing the hydrocarbon fraction in contact with the catalyst according to the invention and hydrogen under the following conditions: at a temperature of between 200 and 400° C., preferably between 230 and 330° C., at a total pressure of between 1 and 3 MPa, preferably between 1.5 and 2.5 MPa, at an hourly space velocity (HSV), defined as being the volume flow rate of feedstock relative to the volume of catalyst, of between 1 and 10 h$^{-1}$, preferably between 2 and 6 h$^{-1}$, and at a hydrogen/gasoline feedstock volume ratio of between 100 and 600 Nl/l, preferably between 200 and 400 Nl/l.

The gasoline hydrotreating process may be performed in one or more reactors in series of the fixed-bed type or of the boiling-bed type. If the process is performed using at least two reactors in series, it is possible to provide a device for removing the H$_2$S from the effluent derived from the first hydrodesulfurization reactor before treating said effluent in the second hydrodesulfurization reactor.

The examples that follow demonstrate the substantial gain claim 1, in activity on the catalysts prepared according to the process of the invention relative to the catalysts of the prior art and specify the invention without, however, limiting the scope thereof.

EXAMPLES

Example 1: Preparation of CoMoP Catalysts on Alumina without Organic Compound C1 and C2 (not in Accordance with the Invention)

To an alumina support having a BET specific surface area of 230 m$^2$/g, a pore volume measured by mercury porosimetry of 0.78 ml/g and a mean pore diameter of 11.5 nm defined as the volume median diameter by mercury porosimetry and which is in "extrudate" form, are added cobalt, molybdenum and phosphorus. The impregnation solution is prepared by dissolving, at 90° C., molybdenum oxide (21.1 g) and cobalt hydroxide (5.04 g) in 11.8 g of an aqueous solution of phosphoric acid at 85% by weight. After dry impregnation, the extrudates are left to mature in a water-saturated atmosphere for 24 hours at room temperature, and are then dried at 90° C. for 16 hours. The dried catalyst precursor thus obtained is denoted C1. Calcination of the catalyst precursor C1 at 450° C. for 2 hours leads to the calcined catalyst C2. The final metal composition of the catalyst precursor C1 and of the catalyst C2 expressed in the form of oxides and relative to the weight of dry catalyst is then the following: $MoO_3$=19.5±0.2 wt %, CoO=3.8±0.1 wt % and $P_2O_5$=6.7±0.1 wt %.

Example 2: Preparation of the CoMoP Catalyst on Alumina C3 (not in Accordance with the Invention) by Introduction of an Organic Compound (Citric Acid) by Co-Impregnation To the alumina support described previously in example 1 and which is in the "extrudate" form are added cobalt, molybdenum and phosphorus. The impregnation solution is prepared by dissolving, at 90° C., molybdenum oxide (28.28 g) and cobalt hydroxide (6.57 g) in 15.85 g of an aqueous 85% solution of phosphoric acid and water. After homogenization of the preceding mixture, 38 g of citric acid were added before adjusting the volume of solution to the pore volume of the support by addition of water. The (citric acid)/Mo mole ratio is equal to 1 mol/mol and the (citric acid)/Co mole ratio is equal to 2.7 mol/mol. After dry impregnation, the extrudates are left to mature in a water-saturated atmosphere for 24 hours at room temperature, and are then dried at 120° C. for 16 hours. The dried catalyst additive-impregnated with citric acid thus obtained is denoted C3. The final composition of the catalyst C3 expressed in the form of oxides and relative to the weight of dry catalyst is then the following: $MoO_3$=19.6±0.2 wt %, CoO=3.7±0.1 wt % and $P_2O_5$=6.7±0.1 wt %.

Example 3: Preparation of the CoMoP Catalyst on Alumina C4 (According to the Invention) by Introduction of an Organic Compound (Butyl Lactate) in the Vapor Phase after the Impregnation of the Metals 3.7 g of butyl lactate contained in a crystallizing dish are placed in a closed chamber. 12 g of the catalyst precursor C1 are introduced into the same closed chamber and placed on a stainless-steel grid so that the liquid butyl lactate is not in physical contact with the catalyst precursor C1. The closed chamber is placed in an oven at 120° C. for 2 hours. 13.9 g of catalyst C4 are thus obtained after the catalyst precursor C1 has been brought together with the butyl lactate compound in liquid form. The amount of butyl lactate thus transferred onto the catalyst is such that the butyl lactate/Mo mole ratio is 0.8 mol per mole of molybdenum (corresponding to 2.2 mol per mole of cobalt). The final metal composition of the catalyst C4 relative to the weight of dry catalyst is: $MoO_3$=19.5±0.2 wt %, CoO=3.8±0.1 wt % and $P_2O_5$=6.7±0.1 wt %.

Example 4: Preparation of the CoMoP Catalyst on Alumina C5 (According to the Invention) by Introduction of an Organic Compound (Butyl Butyryl Lactate) in the Vapor Phase after the Impregnation of the Metals 5.4 g of butyl butyryl lactate contained in a crystallizing dish are placed in a closed chamber. 12 g of the catalyst precursor C1 are introduced into the same closed chamber and placed on a stainless-steel grid so that the liquid butyl butyryllactate is not in physical contact with the catalyst precursor C1. The closed chamber is placed in an oven at 120° C. for 6 hours. 14.7 g of catalyst C5 are thus obtained after the catalyst precursor C1 has been brought together with the butyl butyryl lactate compound in liquid form. The amount of butyl butyryl lactate thus transferred onto the catalyst is such that the butyl butyryl lactate/Mo mole ratio is 0.8 mol per mole of molybdenum (corresponding to 2.2 mol per mole of cobalt). The final metal composition of the catalyst C5 relative to the weight of dry catalyst is: $MoO_3$=19.5±0.2 wt %, CoO=3.8±0.1 wt % and $P_2O_5$=6.7±0.1 wt %.

Example 5: Evaluation in the Hydrodesulfurization (HDS) of Pas Oil of the Catalysts C1, C2 and C3 (not in Accordance with the Invention) and C4 and C5 (in Accordance with the Invention)

The catalysts C1, C2 and C3 (not in accordance with the invention) and C4 and C5 (in accordance with the invention) were tested in the HDS of gas oil.

The characteristics of the gas oil feedstock used are as follows: density at 15° C.=0.8522 g/cm$^3$, sulfur content=1.44% by weight.

Simulated distillation:
IP: 155° C.
10%: 247° C.
50%: 315° C.
90%: 392° C.
FP: 444° C.

The test is performed in an isothermal crossed fixed-bed pilot reactor, the fluids circulating from the bottom upward.

The catalyst precursors are first sulfurized in situ at 350° C. in the reactor under pressure by means of the gas oil of the test to which 2% by weight of dimethyl disulfide are added.

The hydrodesulfurization tests were performed under the following operating conditions: a total pressure of 7 MPa, a catalyst volume of 30 cm$^3$, a temperature of from 330 to 360° C., with a hydrogen flow rate of 24 l/h and with a feedstock flow rate of 60 cm$^3$/h.

The catalytic performances of the catalysts tested are given in table 1. They are expressed in degrees Celsius relative to the (comparative) catalyst C2 chosen as reference: they correspond to the temperature difference to be applied in order to attain 50 ppm of sulfur in the effluent. A negative value means that the target sulfur content is attained for a lower temperature and that there is therefore an increase in activity. A positive value means that the target sulfur content is attained for a higher temperature and that there is therefore a loss of activity.

Table 1 clearly shows the gain on the catalytic effect afforded by the organic compounds according to the invention. Specifically, catalysts C4 and C5 (according to the invention) have higher activities than those obtained for all the other catalysts evaluated. The advantage of the catalysts according to the invention is significant although they have a lower proportion of organic compound than the catalyst C3 with, thus, a higher intrinsic efficacy than that of the other compounds, for which it is necessary to introduce a larger proportion of compound to observe a substantial catalytic effect.

TABLE 1

Isovolumic relative activities in the hydrodesulfurization of gas oil for the catalysts C1 and C3 (not in accordance with the invention) and C4 and C5 (in accordance with the invention) relative to the catalyst C2 (not in accordance).

| Catalyst (comparative or according to the invention) | Organic compound used and compound/Mo mole ratio | Method of introducing the organic compound | HDS activity |
|---|---|---|---|
| C1 (comp) | none | N/A | Base +1.0° C. |
| C2 (comp) | none | N/A | Base |
| C3 (comp) | Citric acid—1.0 mol/mol Mo | Co-impregnation | Base −2.9° C. |
| C4 (iv) | Butyl lactate—0.8 mol/mol Mo | Gas phase after impregnation of the metals | Base −7.2° C. |
| C5 (iv) | Butyl butyryl lactate—0.8 mol/mol Mo | Gas phase after impregnation of the metals | Base −6.3° C. |

The invention claimed is:

1. A catalyst comprising a support based on alumina or silica or silica-alumina, at least one Group VIII element, at least one Group VIB element and at least one compound of formula (I)

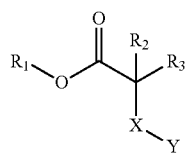

in which:
  $R_1$ is a saturated or unsaturated, linear, branched or cyclic hydrocarbon-based radical comprising from 1 to 12 carbon atoms,
  $R_2$ and $R_3$ are chosen from a hydrogen atom and a saturated or unsaturated, linear, branched or cyclic hydrocarbon-based radical comprising from 1 to 12 carbon atoms,
  X is chosen from an oxygen atom or a sulfur atom, except when $R_2$ and $R_3$ represent a hydrogen atom, in which case X is an oxygen atom,
  Y is chosen from a hydrogen atom, a saturated or unsaturated, linear, branched or cyclic hydrocarbon-based radical comprising from 1 to 12 carbon atoms or a unit —C(O)$R_4$, $R_4$ being chosen from a hydrogen atom and a saturated or unsaturated, linear, branched or cyclic hydrocarbon-based radical comprising from 1 to 12 carbon atoms.

2. The catalyst as claimed in claim 1, in which the compound of formula (I) is chosen from methyl lactate, ethyl lactate, propyl lactate, butyl lactate, isobutyl lactate, isopentyl lactate, cis-3-hexenyl lactate, L-menthyl lactate, butyl butyryl lactate, ethyl 2-mercaptopropanoate, methyl glycolate, ethyl glycolate, butyl glycolate, ethyl ethoxyacetate, ethyl α-hydroxyisobutanoate, tert-butyl α-hydroxyisobutanoate, ethyl 2-hydroxycaproate and ethyl 2-hydroxyvalerate.

3. The catalyst as claimed in claim 1, in which $R_2$ represents a methyl radical and $R_3$ represents a hydrogen atom.

4. The catalyst as claimed in claim 1, in which the compound of formula (I) is chosen from butyl lactate and butyl butyryl lactate.

5. The catalyst as claimed in claim 1, in which the content of Group VIB element is between 5% and 40% by weight expressed as Group VIB metal oxide relative to the total weight of the catalyst and the content of Group VIII element is between 1% and 10% by weight expressed as Group VIII metal oxide relative to the total weight of the catalyst.

6. The catalyst as claimed in claim 1, in which the mole ratio of Group VIII element to Group VIB element in the catalyst is between 0.1 and 0.8.

7. The catalyst as claimed in claim 1, which also contains phosphorus, the phosphorus content being between 0.1% and 20% by weight expressed as $P_2O_5$ relative to the total weight of the catalyst and the mole ratio of phosphorus to the Group VIB element in the catalyst is greater than or equal to 0.05.

8. The catalyst as claimed in claim 1, in which the content of compound of formula (I) is between 1% and 45% by weight relative to the total weight of the catalyst.

9. The catalyst as claimed in claim 1, which also contains an organic compound other than the compound of formula (I) containing oxygen and/or nitrogen and/or sulfur.

10. The catalyst as claimed in claim 9, in which the organic compound is chosen from a compound including one or more chemical functions chosen from carboxylic, alcohol, thiol, thioether, sulfone, sulfoxide, ether, aldehyde, ketone, ester, carbonate, amine, nitrile, imide, oxime, or amide functions.

11. The catalyst as claimed in claim 10, in which the organic compound other than the compound of formula (I) is chosen from γ-valerolactone, 2-acetylbutyrolactone, triethylene glycol, diethylene glycol, ethylene glycol, ethylenediaminetetraacetic acid, maleic acid, malonic acid, citric acid, gluconic acid, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicin, tricin, 2-furaldehyde, 5-hydroxymethylfurfural, 2-acetylfuran, 5-methyl-2-furaldehyde, ascorbic acid, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

12. The catalyst as claimed in claim 10, in which the organic compound is chosen from urea, compounds including a furan ring, or sugars.

13. The catalyst as claimed in claim 1, which is at least partially sulfurized.

14. A process for preparing a catalyst as claimed in claim 1, comprising the following steps:
  a) a compound including a Group VIB element, at least one compound including a Group VIII element, at least one compound of formula (I) and optionally phosphorus are placed in contact with a support based on alumina or silica or silica-alumina, or a regenerated catalyst containing a support based on alumina or silica or silica-alumina, at least one Group VIB element, at least one Group VIII element and optionally phosphorus are placed in contact with at least one compound of formula (I), so as to obtain a catalyst precursor, b) said catalyst precursor derived from step a) is dried at a temperature below 200° C., without subsequently calcining it.

15. A process for preparing a catalyst as claimed in claim 1, comprising the following steps:

i) at least one compound of formula (I) is deposited on a support based on alumina or silica or silica-alumina by performing a step in which said support and the compound of formula (I) in liquid form are brought together simultaneously and without any physical contact between the support and the compound of formula (I) in liquid form, at a temperature below the boiling point of the compound of formula (I) and under pressure and time conditions such that a fraction of said compound of formula (I) is transferred in gaseous form to the support, ii) at least one compound including a Group VIB element, at least one compound including a Group VIII element, and optionally phosphorus are placed in contact with the support based on alumina or silica or silica-alumina, iii) the solid obtained on conclusion of step ii) is dried, step i) being performed before or after steps ii) and iii) or during step iii).

16. A process for preparing the catalyst as claimed in claim 1, comprising the following steps:

i') at least one compound of formula (I) is deposited onto a support based on alumina or silica or silica-alumina by performing a step in which the support is brought together, in a closed or open chamber, with a porous solid containing at least one compound of formula (I), this step being performed under temperature, pressure and time conditions such that a fraction of said compound of formula (I) is transferred gaseously from the porous solid to the support, ii) at least one compound including a Group VIB element, at least one compound including a Group VIII element, and optionally phosphorus are placed in contact with the support based on alumina or silica or silica-alumina, iii) the solid obtained on conclusion of step ii) is dried, step i') being performed separately before or after steps ii) and iii).

17. A process for preparing the catalyst as claimed in claim 1, comprising the following steps:

i″) at least one compound of formula (I) is deposited on a regenerated catalyst containing a support based on alumina or silica or silica-alumina, at least one Group VIB element, at least one Group VIII element and optionally phosphorus, by performing a step in which said regenerated catalyst and at least one compound of formula (I) in liquid form are brought together simultaneously and without any physical contact between the regenerated catalyst and the compound of formula (I) in liquid form, at a temperature below the boiling point of the compound of formula (I) and under pressure and time conditions such that a fraction of said compound of formula (I) is transferred in gaseous form to the regenerated catalyst, or i‴) at least one compound of formula (I) is deposited onto a regenerated catalyst containing a support based on alumina or silica or silica-alumina, at least one Group VIB element, at least one Group VIII element and optionally phosphorus, by performing a step in which the regenerated catalyst is brought together, in a closed or open chamber, with a porous solid containing at least one compound of formula (I), this step being performed under temperature, pressure and time conditions such that a fraction of said compound of formula (I) is transferred gaseously from the porous solid to the regenerated catalyst.

18. A process for hydrotreating and/or hydrocracking of hydrocarbon-based fractions, comprising subjecting said hydrocarbon-based fractions to hydrotreating or hydrocracking conditions in the presence of a catalyst according to claim 1.

\* \* \* \* \*